Oct. 1, 1957  M. MORRISON  2,808,551
SYNCHRONOUS MOTOR DEVICE
Original Filed Oct. 16, 1952  2 Sheets-Sheet 1

INVENTOR.
Mortford Morrison

United States Patent Office 2,808,551
Patented Oct. 1, 1957

2,808,551

SYNCHRONOUS MOTOR DEVICE

Montford Morrison, Rochester, N. Y.

Original application October 16, 1952, Serial No. 314,991. Divided and this application February 3, 1954, Serial No. 407,851

5 Claims. (Cl. 318—47)

The present invention generally relates to electrical means and methods of indicating frequency rates of variations in electrical circuits, it more specifically relates to such methods where pulses of any physical nature may be transduced into electric current and as a specific application it may be employed in the electrical determination of watch rates.

The present application is a division of application Serial No. 314,991, filed October 16, 1952, now abandoned.

Among the general objects of the invention is to provide a super sensitive means and method of determining the relative speeds of revolving shafts and the application of such means and method to the measurement of recurrent energy pulsations or variations.

A specific such application is that of measuring small changes in the frequency of alternating current generators.

A further specific application is to the indication of minute changes in the frequency of watch and clock rates.

The vast majority of American watches tick at a rate of five per second and the difficulty of attaining an electrical method and means of raising this five cycle impulse frequency to a frequency rate which is measurable with electrical instruments is exceedingly difficult and expensive because of the high electrical Q involved in the process.

In the present invention instead of depending upon a high electrical Q, a novel device substituting mechanical means is employed. Among the objectives of the invention is to provide means for converting relatively low rate per second impulses, such as those produced by watch ticks, into relatively high revolutions per second motor devices, which can be utilized at these relatively high revolving speeds to economically measure the rate of the relatively low rate impulses, without the introduction of what is known in such methods as "jittering." That is, in the process of controlling a relatively high frequency current by means of a relatively low frequency impulse, there is an interval during which the low frequency impulse does not control the higher frequency. During this interval the higher frequency system tends to drift in frequency in one direction or the other, such that when controlling impulse is injected into the circuit, the starting point of the higher frequency system is suddenly changed so that the change in this higher frequency is said to "jitter" back or forth at the frequency of the impulse rate.

In the present invention a low frequency pulse is injected for each cycle and therefore fixes the average frequency rate for each cycle and the tie in between the average frequency rate and the high frequency or high speed rate is continuous and therefore cannot jitter.

In the present invention the relatively low pulse frequency of, for example, a watch ticking at rate of approximated five times per second, is converted into an alternating current of five cycles per second, and this five cycle alternating current is caused to control the speed of an electric motor driven from an independent source, and which motor provides energy for the indication desired.

To follow such a plan of frequency measurement, the driving motor speed must be synchronous with the five cycle frequency, because the making of a five cycle synchronous electric driving motor presents problems too tremendous and too extensively complex for practical application to frequency measurement.

Further the shaft speed of a five cycle synchronous motor cannot exceed 300 revolutions per minute, and such a shaft speed is not as well suited to speed measurement by electrical or electromagnetic means as higher shaft speeds, as will be obvious from this specification hereinafter recited, because of the larger and heavier parts required for low shaft speed electrical indications.

A further object of the invention is to provide a synchronizable motor combination in which the main driving torque for the combination is obtained from a source of electric current independent of the source of electric current which fixes the synchronous rotation of the combination.

The applicant is aware of prior art synchronous motor combinations, in which two motors, or their equivalent, are employed to attain synchronous operation from a single source of alternating current, but the operation of these combinations depend upon a single shaft speed and a common source of alternating current for both motor fields, a first motor field providing an accelerating torque which brings the shaft speed up to a value which approaches synchronous speed and then a second motor synchronous field takes over the load and provides all the torque for synchronous operation. The first motor field then acts merely as a damper winding against motor hunting and provides no shaft torque in the absence of hunting.

In the present invention there is no necessary relation between frequencies which may be employed in the two motor combination. To acquire a relatively high shaft speed operating at a fixed multiple frequency of the five cycle per second order, a relatively high speed motor having preferably a low rate of change in its speed torque character in the neighborhood of its loaded operating speed is employed, so that a relatively small amount of added or subtracted torque to the motor shaft will serve to cause it operated at a speed fixed by the added or subtracted torque.

By this means and method a relatively small high-speed high-torque motor by mechanical gearing can be caused to operate at a synchronous multiple shaft speed of a comparatively small low torque synchronous motor.

Further by this means and method the energy required to fix the frequency of shaft revolutions to be measured, is a comparatively small fraction of the total energy required for the speed or frequency indication, where the indication is determined by shaft speed.

Having recited some of the objects of the invention, the applicant will now describe several specific embodiments thereof, from which the nature of the invention may be clearly drawn.

The invention will be more fully understood in its structural characteristics from the following description when read in connection with the accompanying drawings, of which:

Figure 2:
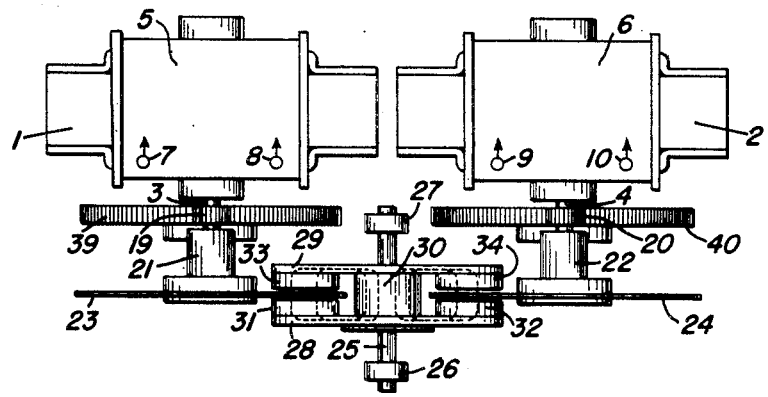
Fig. 2 shows a plan view of Fig. 1.
Figure 1:
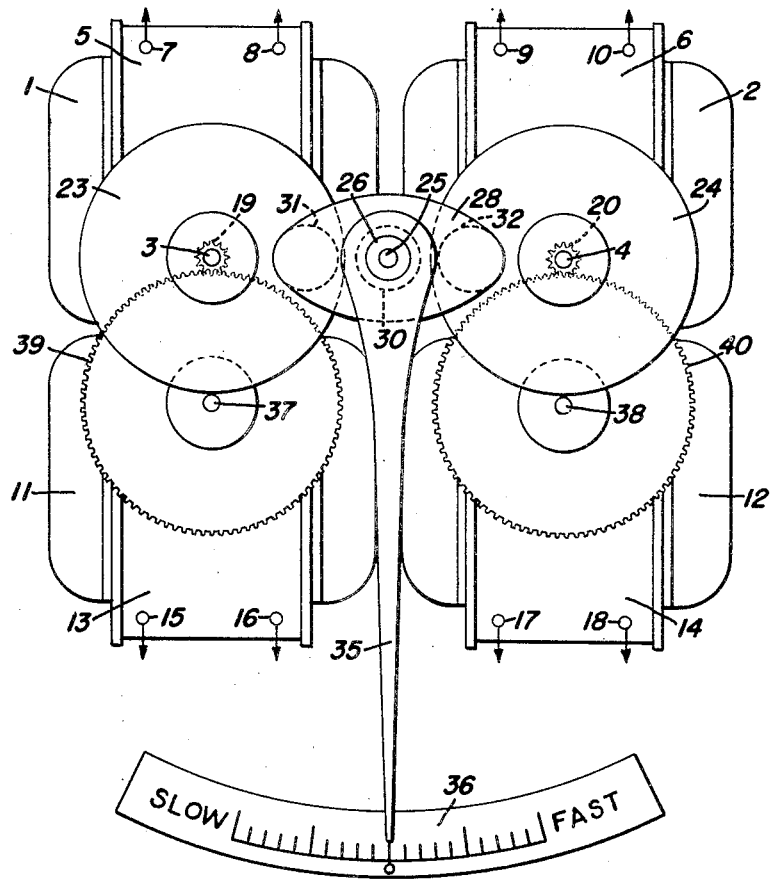
Fig. 1 shows a front elevation of a mechanism used in an embodiment of the invention.

In Figs. 1 and 2 the supporting structure and other parts unessential to the description of the mechanism used are omitted for clearness.

Figure 3:
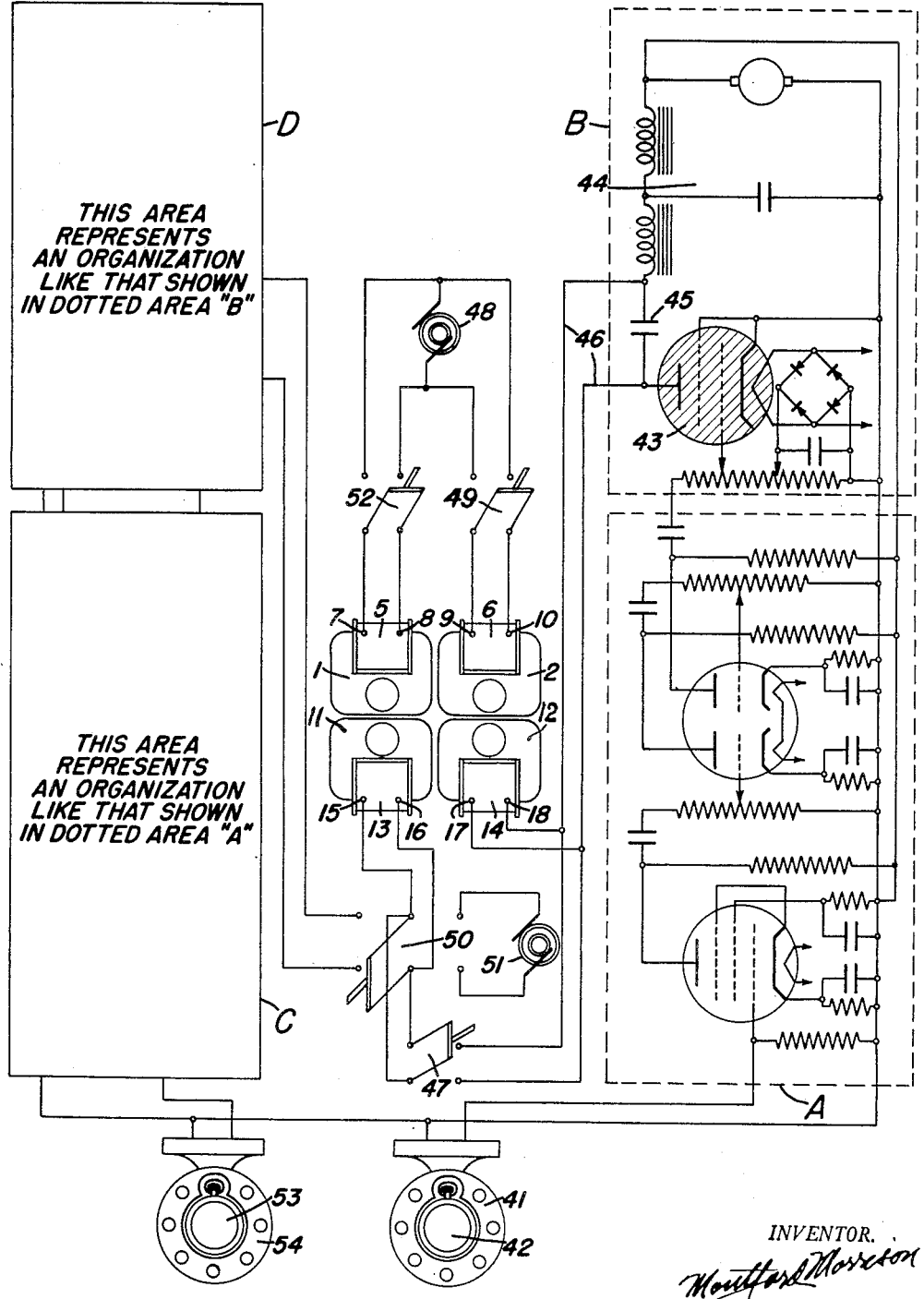

Fig. 3 shows a circuit organization employing the mechanism of Figs. 1 and 2 to complete an embodiment of the invention.

In Fig. 1, 1 and 2 are identical motors of an asynchronous type and while the motors employed in the positions indicated may be driven either from direct current or alternating current, and the principal requirement of these motors is that they have a continuous torque such as found in miniature induction alternating current motors and in direct current commutator motors.

The motors as illustrated in Fig. 1 are squirrel cage induction motors with shaded pole windings and have a no load speed of about 3350 revolutions per minute, but this speed reduces to about 3050 under the load hereinafter described.

The torque of these motors is not sensitive to line voltage variation and is smoothly continuous down to about 2800 revolutions per minute.

The shafts of these motors are identified by 3 and 4 and the stator coils by 5 and 6.

The electrical connections of stator coil 5 are represented by 7 and 8 and the electrical connections to stator coil 6 are represented by 9 and 10.

The numerals above employed appear on the same parts in Fig. 2. In Fig. 1, 11 and 12 are identical motors, but of a synchronous type. The motors 11 and 12 differ from motors 1 and 2 in that the rotors of the higher numbered motors are constructed for synchronous operation. These motors may be of the hysteresis type, the squirrel cage salient pole reaction type (sometimes erroneously referred to as hysteresis motors) or they may be of the type preferred by the applicant, which is of the constant magnetic field rotor type.

In the present embodiment the actual motors employed in the embodiment shown have the same stator laminations for the synchronous type as employed in the asynchronous type. The synchronous type motor has the shading coil windings removed from the stator pole faces and a solid completely cylindrical rotor highly permanently magnetized throughout the direction of some diameter of the cylinder.

Such a motor has a much higher electrical output, for the alternating current input of the field coils 13 and 14, than is attainable with the same electrical input in either an hysteresis type of motor or in a squirrel cage salient pole rotor reaction type.

Motors 1 and 2 having power output rating of .0015 H. P. and motors 11 and 12 are built in motor frames having an output rating of .002 H. P., but these output rates are measured at 60 cycles and the synchronous rating of motors 11 and 12 at the frequency used in connection with these motors is a small fraction of this amount.

Electrical connections for stator coil 13 are represented by 15 and 16 and electrical connections for stator coil 14 are represented by 17 and 18.

On rotor shaft 3 of motor 1 is fixed a pinion 19 and on rotor shaft 4 of motor 2 is fixed a small pinion 20. Pinions 19 and 20 are 13 tooth 64 pitch steel pinions.

Specific numerical values are given in this specification to more clearly fix the size and proportion of the parts employed, and as a matter of fact the parts and elements shown in Figs. 1 and 2 are full size in the original patent drawings.

In Fig. 2 on to an extension of shaft 3 is a hub 21 and on extension of shaft 4 is a similar hub 22. Hubs 21 and 22 carry copper disks 23 and 24 such as employed in eddy current brakes and eddy current motors. As a matter of fact the rotation of these disks hereinafter more fully described, comprise the moving parts of eddy current motors.

The corresponding parts described in Fig. 2 will be identified in Fig. 1 by the corresponding numerals.

Figs. 1 and 2, 25 is a shaft journaled in ball bearings 26 and 27. These bearings may be knife edged bearings, if and when desired. Shaft 25 carried fixed to it a balance beam structure 28. The beam structure 28 comprises a two air-gap permanent field source of magnetic flux having one or more permanent magnets employed in its structure.

In the embodiment shown, beam 28 has an identical beam member 29 and is separated by hollow cylindrical permanent magnet 30. Solid cylinders 31 and 32 are fixed to beam 28 and identical solid cylinders 33 and 34 are fixed to beam member 29. Solid cylinders 31, 32, 33 and 34 may be permanent magnets or materials having just good magnetic permeability.

Obviously if five permanent magnets are employed to create the flux field in the beam structure, stronger magnetic fields are attainable and may be so employed if and when desired.

Those skilled in the art will appreciate that with beam members 28 and 29 of magnetically high permeability material and the permanent magnet or magnets properly arranged, the magnetic flux field will follow the dotted lines illustrated in Fig. 2 and one magnetic flux air-gap is created between solid cylinders 31 and 33 and a second magnetic flux air-gap is created between solid cylinders 32 and 34.

At this point it is believed advantageous to call attention to the fact that the rotation of disk 23 through magnetic flux field which penetrates it, causes balance beam 28 to be angularly displaced along the direction of the rotation of the disk at the area at which the magnetic field flux penetrates the disk. Likewise rotation of disk 24 has the effect of rotating balance beam 28 in a similar way depending upon the direction of rotation of the disk 24.

If disks 23 and 24 rotate in opposite directions and the balance beam 28 is so adjusted along its horizontal axis that the magnetic drag caused between disks on the balance beam causes the pointer 35 to indicate zero position on scale 37, then any difference in speed of disks 23 and 24 will cause the pointer 35 to shift to the right or to the left and the scale can be calibrated by this shift to indicate the difference in the speeds of shafts 3 and 4.

It must be clearly understood that the specific embodiment which is described is only one way of embodying the invention and it must be clearly born in mind that disks 23 and 24 do not have to be of the same size nor do they have to run at the same speed to give a balanced torque on beam 28.

The torque on beam 28, as will be appreciated by those skilled in the art, depends also upon the relative strength of the magnetic fields which penetrate the two disks as well as the distance of the air gap fields from the center of the rotating disks and also does it depend upon whether the disks are made of the same material, the same thickness, or other minor variations well known in the art.

Such a magnetic balance of such a beam constitutes a supersensitive means of detecting minute differences in the speeds of the disks. It will be remembered that in similar structures employed in laboratory weighing balances they can be easily made sensitive to a difference in torque of one milligram or even less. It is, of course, obvious to those skilled in the art that in such a balance beam as described in this invention the beam shaft 25 does not necessarily have to be located between the disks.

The beam shaft 25 is only located between rotating disks 23 and 24 when the disks rotate in opposite directions. However, if and when it is desired to rotate the disks 23 and 24 in the same directions, the magnetic flux gaps would then be located on the same side of each disk and the center shaft 25 would be appropriately located between them. It is not believed that this structure is of sufficient practicability to warrant a special figure in the drawings to disclose it and that the mere mention of such a structure is sufficiently obvious to not require more description of it, for purposes of disclosure.

The structure described in the foregoing disclosures structure members which provide a magnetic balance of beam pointer 35 when disks 23 and 24 rotate in opposite directions and the location of shaft 25 flux strength and other essential elements already described are taken into consideration and the pointer 35 indicates differences in speeds of the disks 23 and 24.

The applicant will now describe how disks 23 and 24 are made to cause the pointer 35 to indicate transduced pulse rates, the frequency of alternating currents and frequency differences in general.

On shaft 37 and 38, Fig. 1, of synchronous motors 11, and 12 are fixed spur gears 39 and 40, Figs. 1 and 2. Spur gears 39 and 40 are 130 tooth 64 pitch gears which are meshed with pinions 19 and 20 of motors 1 and 2 so that asynchronous motors 1 and 2 drive synchronous motors 11 and 12 in the present embodiment at $\frac{1}{10}$ the speed of motors 1 and 2.

The magnetic loading of disks 23 and 24 in their respective air-gaps, plus the loading of synchronous motors rotors of motors 11 and 12, cause the shaft speeds of motors 1 and 2 to reduce to about 3050 revolutions per minute and the shaft speeds of synchronous motors 11 and 12 to be driven at slightly above 300 revolutions per minute, the gear ratio described being 1 to 10.

The structural characteristics necessary to cause pointer 35 to indicate pulse rate frequencies or frequency differences, requires that synchronous motors 11 and 12 be tied in eletrically to alternating current frequencies necessary to accomplish the desired results.

In the present embodiment, which is concerned mainly for the purpose of illustration with the measurement of frequency differences, it will be appreciated that if one two-motor unit drives one disk at a standardized predetermined number of revolutions per minute, that the pointer will indicate zero if and when the other set of motor units runs at the same speed, if they are so set to do and if not, when they are set to zero at equal magnetic drags on the balance beam. So that when one motor unit is set in operation at a standardized frequency the pointer 35 indicates fast or slow depending upon the alternating current frequency feed to the other unit.

Application of the structure above described to the measurement of watch rates is set forth in Fig. 3 which will now be discussed. In Fig. 3 the electric motors described in Figs. 1 and 2 are shown with their stators alone and without gears and other mechanism for the sake of clearness. The numerals of Fig. 3 which are found in Figs. 1 and 2 represent the same members and it is not thought necessary nor advantageous to re-describe members already described.

In Fig. 3 the organization contained in dotted area "A" represents a conventional impulse amplifier which is signal fed by microphone 41.

The organization shown in dotted area "B" represents a relaxation type oscillator employing a gas tetrode or equivalent electronic discharge device, similar to those described in applicant's Patent Numbers 2,390,659 and 2,435,751.

It is believed that these two circuit organizations are sufficiently conventional not to require any description of them. The ticks from watch 42 are amplified through the conventional amplifier contained in dotted area "A" and the output of this amplifier is connected to the control electrode of gas tetrode 43, which controls relaxation oscillator of the type shown in the dotted area "B."

The starting time for each oscillation of relaxation oscillator "B" is instituted by the amplification of the watch tick 42, but its sinusoidal character is determined by the filter organization 44, the capacitor 45 and the inductance which bridges the capacitor 45 in the bridge circuit 46.

Area "B" in cooperation with its external shunt circuit 46 becomes a source of alternating current having a period corresponding to the frequency determined by the ticks of watch 42. The period of said alternating current is determined by the interval between the ticks of the watch and therefore is adjusted, if necessary, when the watch rate changes to exactly represent the beat rate of the watch.

The external circuit 46 of the oscillator "B" is led to synchronous motor 12 and to a switch 47, Fig. 3.

Asynchronous motor 2 may be connected to an alternating current voltage source 48 by closing switch 49.

When voltage source 48 is in operation and switch 49 is closed, the unit combination composed of motors 2 and 4 are set into operation and in the absence of watch ticks from 42, motor 2 operates in the neighborhood of 3050 revolutions per minute. When watch ticks from watch 42 are set into use, the amplified pulsations of these ticks being, say, exactly 5 per second generate a generally sinusoidal frequency in oscillator "B" which in turn causes a load on the rotor of synchronous motor 4 until it finally pulls it down to a speed of exactly 300 revolutions per minute. At this time asynchronous motor 2 operates at exactly 10 times this speed or exactly 3,000 revolutions per minute. If switch 50 is closed in the righthand direction on the highly standardized alternating current source 51 and switch 52 is closed providing driving power to asynchronous motor 1, synchronous motor 11 giving maximum torque at 300 revolutions per minute causes motor 1 to operate at exactly 3,000 revolutions per minute and an opposite magnetic drag on balance beam 28. Disks 23 and 24 (Fig. 1) cause pointer 35 to indicate zero which means that watch 42 is ticking exactly the same rate as the frequency of source 51. If the ticks of watch 42 exceed 5 per second the magnetic drag on the beam 28 indicates fast on the scale 36 and if the ticks of the watch 42 do not equal 5 per second, the drag on beam 28 decreases some and the pointer indicates slow, which provides a supersensitive method of indicating the rates of going of a watch directly, which is visible to all concerned without the employment of charts or other special indicating apparatus which requires knowledge and skill to understand.

The readings are immediate and no time is lost in making and interpreting charts and similar devices.

If a standardized frequency source such as 51 is not available a standardized watch 53 may be employed to take its place at a much less over all cost. Watch 53 has its ticks transduced into electronic current by microphone 53, which is fed into an amplifier "C" which may be an exact duplicate of the amplifier shown in dotted area "A." Amplifier "C" output is fed into oscillator "D" which may be an exact duplicate of the oscillator shown in dotted area "B." The output of oscillator "D" is fed to the left hand set of contacts of switch 50 which in turn connects it to synchronous motor 11, controlling the speed of asynchronous motor 1 which is driven by electronic current source 58 when switch 52 is closed. When switch 50 is closed against its left hand contacts the operation of the device is exactly similar to the operation of the before described conditions when switch 50 is closed against the right hand contacts operating from standardized frequency source 51, the only difference being that the watch 53 and its connected circuit supplies the standardized frequency instead of frequency source 51.

If switches 49 and 52 are closed and switch 50 is allowed to remain open and switch 47 is closed both synchronous control motors then operate from the same frequency source and under this condition balance beam 28 and its associated member parts can be adjusted to zero, thus definitely and in a very simple manner providing means for calibrating the zero position of the pointer 35.

While this method does not necessarily calibrate the divisions on scale 36, it is to be remembered that in most cases of regulating the going rates of watches it is desired to find the no gain and no loss position rather than set it to some definite loss or some definite gain position.

However, the markings on scale 36 can be drawn as accurately as desired. Those skilled in the art will appreciate that this invention can be used in power plants to obtain the instantaneous frequency or speeds that require close frequency control, by the employment of a standardized frequency source 51 instead of by the present method of waiting until the frequency again is sufficient to be noticeable on a clock which may require some time.

The present invention provides a precision frequency meter for power plants not obtainable by any indicating frequency instrument of the prior art.

Further and other applications are obvious to those skilled in the art to which the invention appertains.

Having described the objects and nature of this invention the novelty thereof is more clearly set forth in the appended claims.

I claim:

1. In an apparatus deriving time control signal energy from a source of relatively short duration periodic electrical impulses separated by effectively zero energy relatively long time intervals jointly having time-controlled repetition frequency and providing instrument electric motor shaft speeds supersynchronous with the two-pole synchronous motor speed of said frequency, a source of timed frequency electrical signal impulses separated by effectively zero energy time intervals, electron discharge tube circuit organization means converting said separated signal impulses into an alternating current having an effecively coninuous wave form and a frequency identical with the repetition frequency of said impulses, a synchronous electric motor deriving useful torque energy from said alternating current only at synchronous frequency speed, an asynchronous electric motor having continuous torque through a wide range of speeds including a multiple speed of said synchronous frequency speed, a separate source of driving energy for said asynchronous motor, and rigid linkage mechanical gearing comprising a toothed gear speed-multiplying power transmission coupling the shafts of said motors to operate in exact timed relation to the periodicity of said signal impulses.

2. In an apparatus deriving time control signal energy from a source of relatively short duration periodic electrical impulses separated by effectively zero energy relatively long time intervals jointly having time-controlled repetition frequency and providing instrument electric motor shaft speeds supersynchronous with the two-pole synchronous motor speed of said frequency, a source of timed frequency electrical signal impulses separated by effectively zero energy time intervals, said frequency being of a relatively low order, electron discharge tube circuit organization means converting said separated signal impulses into an alternating current having an effectively continuous waveform and a frequency identical with the repetition frequency of said impulses, a synchronous electric motor deriving useful torque energy from said alternating current only at synchronous frequency speed, an asynchronous electric motor having continuous torque through a wide range of speeds including a multiple speed of said synchronous frequency speed, said multiple speed being of an order relatively high to the two-pole synchronous speed of said synchronous motor, a separate source of driving energy for said asynchronous motor, and rigid linkage mechanical gearing comprising a toothed gear speed-multiplying power-transmission coupling the shafts of said motors causing the coupled speed of said motors to operate in exact timed relation to the periodicity of said signal impulses.

3. In an apparatus deriving time control signal energy from a source of relatively short duration periodic electrical impulses separated by effectively zero energy relatively long time intervals jointly having time-controled repetition frequency and providing instrument electric motor shaft speeds supersynchronous with the two-pole synchronous motor speed of said frequency, a source of timed frequency electrical signal impulses separated by effectively zero energy time intervals, said frequency being of the order of the beats per second of timepieces, electron discharge tube circuit organization means converting said separated signal impulses into an alternating current having an effectively continuous waveform and a frequency identical with the repetition frequency of said impulses, a synchronous electric motor deriving useful torque energy from said alternating current only at synchronous frequency speed, an asynchronous electric motor having continuous torque through a wide range of speeds including a multiple speed of said synchronous frequency speed, said multiple speed being of an order of rotations per second suited to eddy current speed indicators, a separate source of driving energy for said asynchronous motor, and rigid linkage mechanical gearing coupling the shafts of said motors causing the coupled speed of said motors to operate in exact timed relation to the periodicity of said signal impulses.

4. In an apparatus deriving time control signal energy from a source of relatively short duration periodic electrical impulese separated by effectively zero energy relatively long time intervals jointly having time-controlled repetition frequency and providing instrument electric motor shaft speeds supersynchronous with the two-pole synchronous motor speed of said frequency, a source of timed frequency electrical signal impulses separated by effectively zero energy time intervals, electron discharge tube circuit organization means converting said separated signal impulses into an alternating current having an effectively continuous waveform and a frequency identical with the repetition frequency of said impulses, a synchronous electric motor deriving useful torque energy, from said alternating current only at synchronous frequency speed, an asynchronous electric motor having continuous torque through a wide range of speeds including a multiple speed of said synchronous frequency speed, a separate source of driving energy for said asynchronous motor, rigid linkage mechanical gearing comprising a toothed gear speed-multiplying power-transmission coupling the shafts of said motors, and two said motors coupled forming an electromechanical filter reducing extraneous electrical organization oscillations about the mean frequency of said timed impulses.

5. In an apparatus for converting periodic electrical impulses of a relatively low frequency into alternating currents and driving an electric motor at shaft speeds supersynchronous to the two-pole synchronous motor speed of said low frequency, a source of periodic electrical impulses, an electric motor operable at said supersynchronous speed, electron discharge tube circuit organization means converting said impulses into alternating current, said alternating current providing driving energy for said motor, and said organization means including a toothed gear speed-multiplying power-transmission including rigid linkage electromechanical filter means reducing extraneous electrical organization oscillations about the mean frequency of said electrical impulses.

References Cited in the file of this patent

UNITED STATES PATENTS

| 1,686,638 | Pierce | Oct. 9, 1928 |
| 1,728,554 | Knight | Sept. 17, 1929 |
| 1,849,645 | Stoller | Mar. 15, 1932 |
| 2,114,859 | Schaelhlin | Apr. 19, 1938 |
| 2,506,766 | Bartelink | May 9, 1950 |
| 2,577,190 | Hare | Dec. 4, 1951 |

FOREIGN PATENTS

| 196,402 | Germany | Mar. 12, 1908 |